United States Patent [19]
Grossbach

[11] 4,094,533
[45] June 13, 1978

[54] SEATBELT SYSTEM FOR MOTOR CARS

[76] Inventor: Alfred Grossbach, Lindenstrasse 42, Tamm, Wttbg, Germany

[21] Appl. No.: 765,759

[22] Filed: Feb. 4, 1977

Related U.S. Application Data

[62] Division of Ser. No. 596,293, Jul. 16, 1975, Pat. No. 4,047,737.

[30] Foreign Application Priority Data

Jul. 19, 1974 Germany ..................... 2434748
Jul. 4, 1975 Germany ..................... 2529811

[51] Int. Cl.² .............................................. B60R 21/02
[52] U.S. Cl. .................................................. 280/745
[58] Field of Search ............................ 280/745; 296/155

[56] References Cited
U.S. PATENT DOCUMENTS

| | | | |
|---|---|---|---|
| 3,594,036 | 7/1971 | Cadion | 296/155 |
| 3,850,446 | 11/1974 | Hogensen | 280/745 |
| 3,995,884 | 12/1976 | Bauer et al. | 280/745 |

*Primary Examiner*—Robert R. Song
*Attorney, Agent, or Firm*—Toren, McGeady and Stanger

[57] ABSTRACT

In a seat belt system for a motor vehicle, there is provided an arrangement for mounting one or more safety belts including a shoulder safety belt or a pelvis safety belt or both, with one end of the belt being connected to a center portion of the vehicle body and the other end of the belt being connected to the inner side of a sliding door which opens into an intermediate position parallel with the side wall of the vehicle body. The safety belt is locked automatically when the sliding door is closed and opened automatically when the sliding door is opened. The end of the safety belt attached to the door is connected by a pivoted lever which operates in cooperation with another pivoted lever mounting the door to the vehicle body.

6 Claims, 10 Drawing Figures

SEATBELT SYSTEM FOR MOTOR CARS

This is a division of application Ser. No. 596,293 filed on July 16, 1975 now U.S. Pat. No. 4,047,737.

BACKGROUND OF THE INVENTION

Motor vehicles are equipped with seat belts, usually in the form of a combined shoulder and pelvis belt, but occasionally also in the form merely of a shoulder belt in order, in the event of a collision of the vehicle with an obstacle or another vehicle, to hold back its occupant uniformly with the vehicle by using the braking distance which is formed essentially by the bonnet which projects forward, and so protect him from serious injuries which are usually the result of the striking of the occupant against more or less rigid parts of the bodywork or the steering wheel. As seat belts are frequently not applied because of negligence, particularly in short-distance and town traffic, where driving is at sufficiently low speeds to make a maximum protective effect possible, so-called passive seat belt systems have been produced which ensure automatic application of belts when the door of the vehicle is closed.

SUMMARY OF THE INVENTION

The task underlying the invention is to produce such a passive seat belt system for motor vehicles equipped with sliding doors, whose sliding doors, when they are opened, can be moved out of their closing position located in the side wall of the vehicle body, firstly into a parallel intermediate position and finally along the outside of the vehicle into the opening position.

This task is solved in accordance with the invention, in that at least one belt, more especially a shoulder belt, is provided which, on the one hand, is fastened to the vehicle body between the seats in the area of the centre of the vehicle, and on the other hand, is advantageously fastened in the area of its rear end to the door body of the sliding door.

Within this framework, the invention can be embodied in various ways.

In accordance with one type of embodiment, the belt is fastened on the side of the door directly or by the provision of connecting media, rods, cable controls or the like, to the arm of a lever which pivots in an opposite direction to the support arm which supports the sliding door in its moved-out intermediate position and in its opening position and is connected to the vehicle body, which lever arm is advantageously coupled via gear media to the support arm in such a way that it pivots through an angle which is greater than the support arm and is rigidly locked in at least one final pivoting position.

In accordance with another type of embodiment, the door fastening point of the belt is movable in the longitudinal direction of the vehicle, is arranged in the area of the doorstep and is coupled to the outwardly movable support device of the sliding door in such a way that when the door is moved, it is moved in an opposite direction to the latter. The door fastening point is here advantageously formed by a slide block or roller carriage which is movable in the longitudinal direction of the vehicle in a guide rail which is inserted in the doorstep.

According to another type of embodiment, the door fastening point of a shoulder belt in the area of the rear edge of the door body is movable in a vertical direction, whereby the belt is fastened on the one hand above the seat in the centre of the vehicle body, and if necessary, to a corresponding strutting of the roof of the vehicle body, and on the other hand to a slide block or roller carriage which is movable in a pointed guide rail. With the slide block or roller carriage there is coordinated a draw spring and also a pull-back device, in such a way that when the door is opened, slide block or roller carriage is automatically pulled upwards by the draw spring, and when the door is closed, it is pulled downwards against the force of the draw spring.

In the case of all the aforementioned types of embodiments, besides a shoulder belt which is automatically applied when the door is closed, a pelvis and/or knee belt can be provided which can be applied manually, whose lock is advantageously arranged on the door body and is coupled to the door lock operating mechanism in such a way that it is automatically locked or opened by operation of the door lock.

In the case of a sliding door which opens forwardly, both belts of a three-point belt, in accordance with the invention, are fastened to the rear edge of the door body via rollers which are independent of each other and are provided with a stopping device which is coupled to the door locking device by the provision of rods.

In another type of embodiment, a single-part belt runner is retained in a pull-through or a belt roller in the centre of the vehicle and fastened at one end to the rear edge of the door body rigidly or via a belt roller, and at the other end to a pivoting lever which is connected to the door body and can be pivoted in a substantially vertical plane, whereby the pivoting lever or its mounting simultaneously forms a deforming member for the purpose of limiting the force of the belt.

BRIEF DESCRIPTION OF THE DRAWING

The invention is described in detail in the following description with the aid of several embodiments which are represented in the drawing, but without any limitation to these.

In the drawing

DETAILED DESCRIPTION OF THE INVENTION

Figure 1:
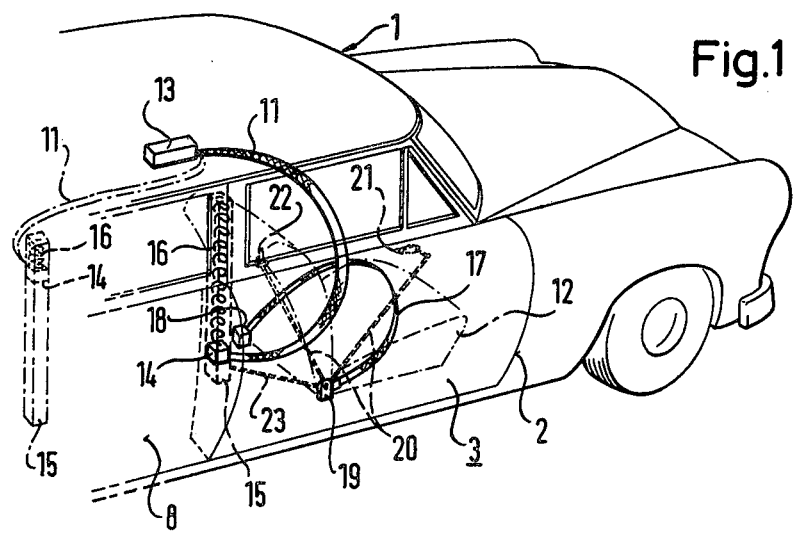
FIG. 1 shows a diagrammatic representation of a motor vehicle which is equipped with sliding doors and a passive seat belt system.

In the vehicle body of a motor vehicle referred to generally by 1, door spaces 2 which are provided can be closed in each case by sliding doors mounted on a guide rail 5 surrounded by a guide head 4 which is supported on a support arm 6 which is pivotable about a vertical axis 7 and is connected to the side wall 8 of the vehicle body. The support arm 6 is pivotably connected to the guide head 4 about an axis 10 which is parallel to the axis 7. When the sliding door is opened, the door body 3, starting from its closed position located in the side wall of the vehicle body, is pivoted by the support arm 6 into a parallel intermediate position which can be seen from FIGS. 2 and 3 or 4 and 8, and finally moved in the longitudinal direction of the vehicle. Here, in the case of the embodiments of FIGS. 1 to 3, a rearwardly movable suspension of the door body 3 is provided, while in the case of the embodiment of FIG. 4, a door body 3 is moved forwardly for opening. In the case of the embodiment of the invention shown in FIG. 1, a transverse shoulder belt 11 is fixed to the centre of the vehicle body above the seat 12 in a fastening device which is a conventional automatic belt roller 13. The other end of the belt end is fastened to a slide block 14 which is reciprocable in a guide rail 15 which is substantially vertical and is arranged on the door body 3 in the area of its rear end. On the slide block 14 there acts, on the one hand, a draw spring 16, which pulls the sliding door 3 into its intermediate position when it is opened, and on the other hand there acts a pull-back device which is not shown in detail in the drawing and which is formed by a traction cable which is connected to the support device 4, 6, 7, 9 and 10 of the sliding door 3, which pulls the slide block 14 when the door is pivoted into its closing position against the force of the draw spring 16 into its lower position and holds it there. Besides the passive transverse shoulder belt 11, a pelvis belt 17 which can be applied manually in the usual way is also provided which, on the one hand, is fastened via a conventional automatic belt roller 18 in the centre of the vehicle body to the floor of the vehicle body or to the cardan tunnel; and on the other hand, can be fixed into a lock 19 which is arranged on the door body 3. The lock 19 is advantageously coupled via rods 20 not only to the door lock operating mechanism 21 but also to the door locking button 22, in such a way that the lock 19 is automatically opened when the door lock is opened. Independently of the door lock operating mechanism 21, the lock 19 can also be opened via the button 22 of the door locking mechanism. Via a further rod branch 23, retention of the slide block 14 in its lower position which forms the door-sided fixed point for the transverse shoulder belt 11, can be actuated (?) by means of the button 22 of the door locking mechanism. In conjunction with the reds 20 and 23, the button 22 of the door locking mechanism simultaneously forms an emergency lock for the seat belt system.

Figure 2:
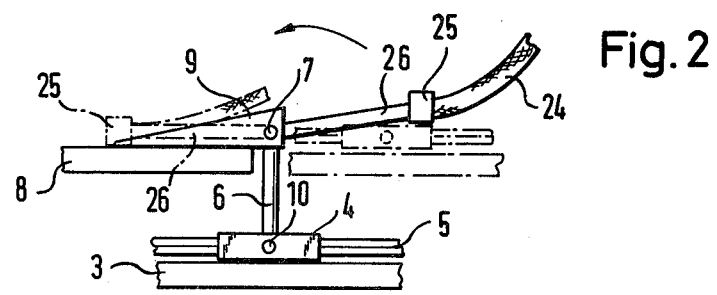
FIG. 2 shows a diagrammatic representation of another type of embodiment of the invention.

In the case of the embodiment represented in FIG. 2, a transverse shoulder belt 24 is fastened to a pivotable lever arm 26 via a fastening device 25, which can also be an automatic belt roller, which together with the support arm 6 of the support device of the sliding door 3, is pivotably fastened to the bracket 9. The lever arm 26 is coupled to the support arm 6 via gear media which are not shown in detail in the drawing, in such a way that upon pivoting of the support arm 6 and therefore with the pivoting out or in of the door 3 into its intermediate position or its closing position, it carries out a pivotal movement which is opposite to the pivotal movement of the support arm 6 and extends over an angle which is approximately twice as large. Here, in order to avoid great space requirement, it can be arranged that the pivoting arm 26 is pivotable about a substantially horizontal axis and points substantially upwards when the sliding door 3 is opened and substantially downwards when the sliding door 3 is closed.

Figure 3:
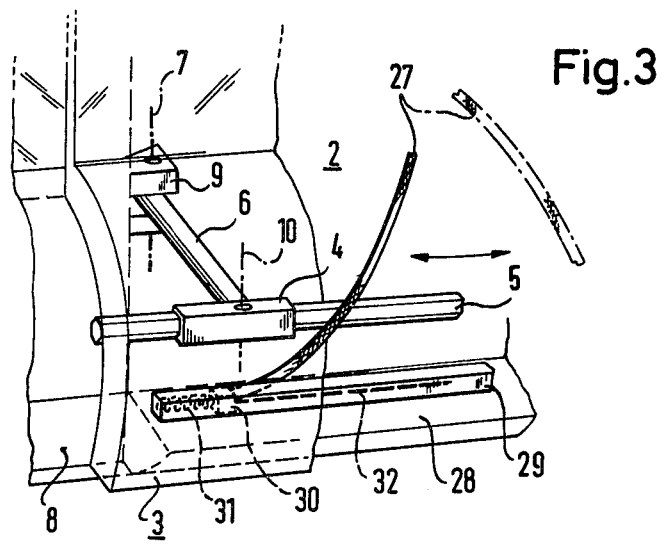
FIG. 3 shows a cut-out representation of a further type of embodiment of the invention.

In the case of the embodiment of the invention represented in FIG. 3, the fastening point of the end of a transverse shoulder belt 27 is formed by a slide block 30 which is reciprocable in a guide rail 29 which is arranged in the doorstep 28, whereby the belt 27, which is fastened at the one end above the seat 12 in the centre of the vehicle body, is fastened, by provision of a belt roller, to the slide block 30, the roller not being shown in the drawing. At one end of the slide block 30 there acts a draw spring 31 which pulls the latter into its rear position and at the same time the transverse shoulder belt 27 into its working position, and at the other end there acts a cable control 32 which, via guide and gear media not shown in the drawing, is connected to the support device 4, 6 and 9 of the door 3 in such a way that the slide block 30, when the door 3 is pivoted out into its intermediate position, is pulled forwards, and with this the transverse shoulder belt 27 is pulled into its release position.

Figure 4:
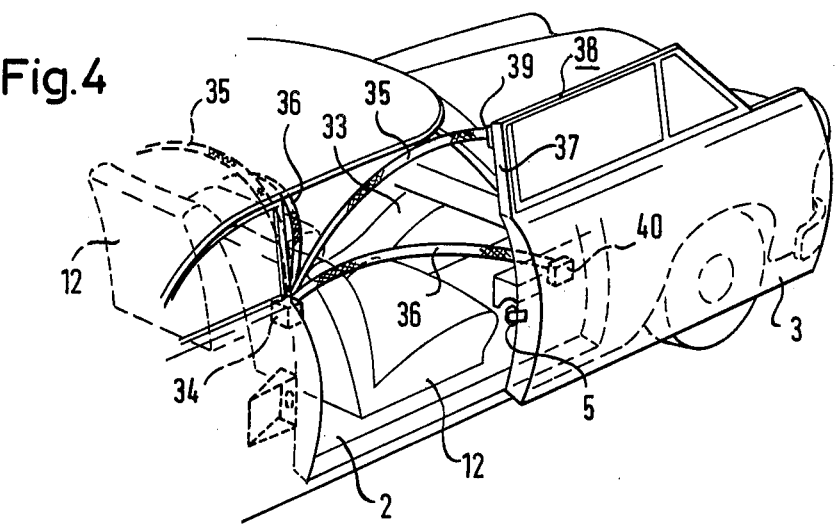
FIG. 4 shows a representation of a motor vehicle which is equipped with forward opening sliding doors and a seat belt system according to the invention.

The motor vehicle which is represented in FIG. 4 is equipped with forward-opening sliding doors 3. Transverse shoulder belts 35 and pelvis belts 36 are fastened to a fastening device 34 which is arranged on the cardan tunnel 33 is the centre of the vehicle body. On the door, the transverse shoulder belts 35 are fastened in an automatic belt roller 39 which is fastened to the rear top beam of the door frame 38. The pelvis belts 36 are fastened to a belt roller 40, which is also automatic and is arranged in the area of the rear top beam 37 of the door 3. Both belt rollers 39 and 40 are provided with a known stopping device, which is not shown in detail in the drawing, and which is coupled via rods 41 to the door lock operating mechanism in such a way that the locking device is operated automatically with the door lock , as was described in the embodiment of FIG. 1. In addition, the locking device of the automatic belt roller 39 and 40 can be operated by means of the button 22 of the door locking mechanism by provision of a further rod branch 42. The button 22 here represents an emergency lock operating mechanism for locking the automatic belt roller 39 and 40, so that in cases of emergency, locking of the belts 35 and 36 can be released from outside.

Figure 5:
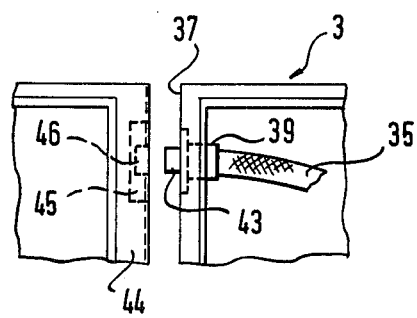
FIG. 5 shows a cut-out representation of a support of a door belt-fastening point.
Figure 6:
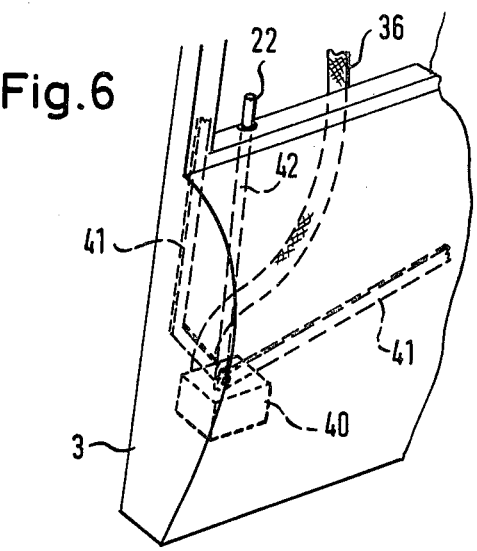
FIG. 6 shows a sectional representation of an emergency locking device for seat belts.
Figure 7:
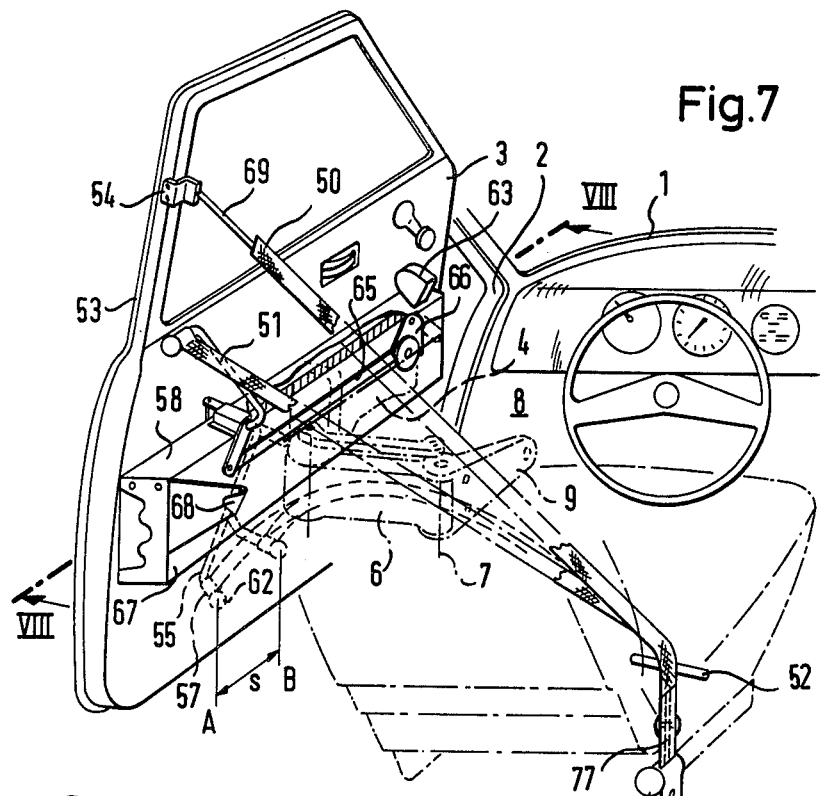
FIG. 7 shows a diagrammatic representation of a motor vehicle which is equipped with forward-opening sliding doors and a seat belt system.
Figure 8:
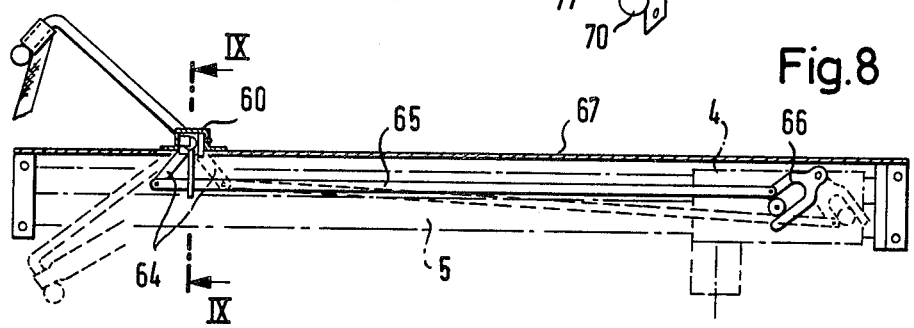
FIG. 8 shows a section through FIG. 7 along the line VIII-VIII.
Figure 9:
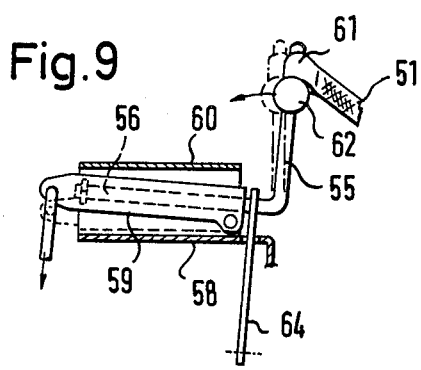
FIG. 9 shows a section through FIG. 8 along the line IX-IX.
Figure 10:
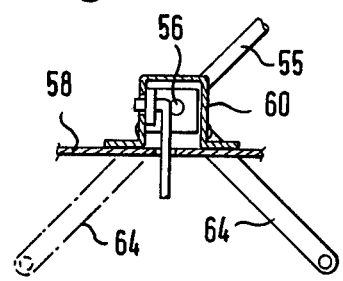
FIG. 10 shows a front view of FIG. 9.

Finally, in FIG. 5 there is represented an anchoring device for the door body 3 in its closed position. In the area of the belt roller 39 there is arranged on the rear top beam 37 of the door frame 38 a peg 43 which projects over its narrow side and which, upon pivoting of the door 3 into its closed position, comes into engagement with a recess 46, which is arranged on the narrow side of the door frame 44 and is strengthened by a slotted plate 45. By the positive connection 43 and 46 between door 3 and door frame 44, the belt forces in the shoulder belt 35 are substantially supported against the vehicle body, and the top beam 37 is completely relieved of belt forces. A corresponding device is also coordinated with the lower belt roller 40.

In FIGS. 7 to 10 there is represented a further type of design of the invention, in which a seat belt embracing a shoulder belt 50 and a pelvis belt 51 is held by a single part-(?) in the centre of the vehicle in a pull-through 52 fastened to the vehicle floor or to the cardan tunnel. One end of the shoulder belt 50 is firmly fastened to the rear edge 53 of the door body 3 by a stud part 54, and of the pelvis belt 51 one end is fastened to the free end of a pivoting lever 55. The pivoting lever 55 has two angular extensions 56 and 57. The lever 55 is pivotally mounted by angular extension 56 about an axis which is substantially oblique to the plane of the door body in a pivotal mounting 59 which is fastened to a cover for the sliding guide 4 and rail 5 of the sliding door, which forms an arm-rest 58. As can be seen, especially from the representation of FIG. 9, the pivotal mounting 59 is inclined slightly inwards and downwards, so that the pivoting lever 55 is moved in a plane which forms an acute angle with the plane of the door body 3, and is thereby brought up close to the door body 3 in its rearward and downward pointing security position, so that satisfactory maneuverability of the sliding door 3 is ensured. The pivotal mounting 59, in the embodiment shown, is fixed to the section of the arm-rest 58 which is transverse to the plane of the door, and is provided with a cover 60. The pelvis belt 51 which is fastened to the angular extension 57 of the pivoting lever 55 by means of a runner 61 is secured against slipping off by a ball-shaped thickening 62 on the free end of the angular extension 57. The movement of the pivoting lever between its substantially forward and upward pointing release position and its substantially rearward and downward pointing security position takes place by provision of the handle 63 which is coordinated with the door locking mechanism, whereby the pivoting lever 55 is connected to the bolt latch 66 of the door locking mechanism by a lever arm 64 which is connected to its angular extension 56 and is pointed radially to the pivotal mounting 59, and a connecting rod 65 which is parallel to the guide rail 5. The pivoting lever 55 in the embodiment shown is designed as a substantially permanently deformable member for the purpose of limiting the force of the belt, and butts in its rearward and downward pointing security position against a stop which is arranged on the vertical lateral surface 67 of the armrest 58, and in the embodiment shown, is formed by a sheetmetal angle 68, so that in the event of the occurrence of excessive tractive force in the belt, it is bent. In the event of the bending of of the pivoting lever 55 transforming tractive force into deforming work, its angular extension 57 moves from its normal position indicated by A into the final position indicated by B, so that the path s is available for the work of deformation. Into the belt length there is inserted a self-blocking belt roller which can either be formed by the fitting 54, or can be arranged in the centre of the vehicle instead of the pull-through 52. In the case of a belt roller being arranged instead of the fitting 54, the free end of the belt section which forms the shoulder belt 50 is connected to a wire cable section 69, via which the belt section 50 is connected to the roller. If, as indicated in FIG. 1, instead of the pull-through 52, a self-blocking belt roller 70 is fastened in the centre of the vehicle, a wire cable section 77 is inserted into the belt runner which forms the two belts 50 and 51, via which not only the shoulder belt 50 but also the pelvis belt 51 is connected to the belt roller 70.

I claim:
1. A seat belt system particularly for motor vehicles having doors which open and close by movement thereof forwardly and rearwardly of said vehicle, said vehicle including a vehicle body having a side wall, said vehicle body having a front, a back and a center spaced between said front and back, at least one sliding door mounted on said side wall of said vehicle body and movable from a closed position flush with the side wall of said vehicle body to an intermediate position parallel with and spaced from the closed position and then to an open position spaced in the longitudinal direction of the vehicle from the intermediate position, and means for mounting said door to said vehicle including a first pivotal arm pivotally mounting said door to said vehicle body, each of said at least one sliding doors having an inner side with the inner side having a front end and a rear end, said seat belt system comprising at least one safety belt having a first end and a second end, means mounting said first end to said center of said vehicle, means mounting said second end with said at least one safety belt extending freely in an unrestrained condition continuously from said first end to said second end, said means mounting said second end of said at least one safety belt including a second pivotal arm having said second end of said safety belt attached thereto and operatively associated with said first pivotal arm, said second pivotal arm operating to effect pivotal movement in response to pivotal movement of said first pivotal arm to move said second end of said at least one belt relative to said door to a first belt position to dispose said safety belt in an orientation permitting ingress and egress of a passenger into and out of said vehicle when said door is in said open position, and to a second belt position to dispose said belt to actively restrain a passenger in said vehicle when said door is moved to said closed position.

2. A system according to claim 1 wherein said first pivotal arm comprises a first end pivotally connected to said vehicle frame and a second end having said door connected thereto, said second pivotal arm having a first end and a second end, said second end of said second pivotal arm having said second end of said safety belt connected thereto, said system further including means connecting said first end of said second pivotal arm to said first end of said first pivotal arm so that said second pivotal arm is pivoted in the opposite direction to the pivoting direction of said first pivotal arm and at a substantially greater angle for each angle of rotation of said first pivotal arm.

3. A system according to claim 2, further comprising a guide head pivotally connected to said second end of said first pivotal arm, and a guide rail mounted to said inner side of said ng to claim 2, further comprising a guide head pivotally connected to said second end of said first pivotal arm, and a guide rail mounted to said inner side of said one sliding door for guiding the movement of said guide head therealong when said sliding door is moved between the closed position and the intermediate and open positions.

4. A system according to claim 2 further including roller means connecting said second end of said safety belt to said second end of said second pivotal arm to permit rolling and unrolling of said belt relative thereto.

5. A system according to claim 1 wherein said first pivotal arm and second pivotal arm are mounted to said vehicle body to pivot about a first axis and a second axis, respectively, said first and second axes extending in intersecting relationship.

6. A system according to claim 5 wherein said first axis of said first pivotal arm extends in a generally vertical direction and wherein said second axis of said second pivotal arm extends in a substantially horizontal direction, said second pivotal arm being actuated by movement of said first pivotal arm to extend in a substantially upwardly directed vertical orientation when said door is opened and in a substantially downwardly directed vertical orientation when said door is closed.

* * * * *